United States Patent

Nishiyama et al.

[11] Patent Number: 5,846,067
[45] Date of Patent: Dec. 8, 1998

[54] LOW-NOX BURNER

[75] Inventors: Tomohiko Nishiyama; Kazuhisa Mitani, both of Toyota; Ryoichi Tanaka; Mamoru Matsuo, both of Yokohama, all of Japan

[73] Assignees: Toyota Jidosha Kabushiki Kaisha, Aichi-ken; Nippon Furnace Koayo Kabushiki Kaisha, Kanagawa, both of Japan

[21] Appl. No.: 765,950

[22] PCT Filed: Jul. 17, 1995

[86] PCT No.: PCT/JP95/01418

§ 371 Date: Jan. 15, 1997

§ 102(e) Date: Jan. 15, 1997

[87] PCT Pub. No.: WO96/02793

PCT Pub. Date: Feb. 1, 1996

[30] Foreign Application Priority Data

Jul. 18, 1994 [JP] Japan .................................. 6-187852
Sep. 24, 1994 [JP] Japan .................................. 6-254568
Apr. 28, 1995 [JP] Japan .................................. 7-127374

[51] Int. Cl.⁶ .................................................. F23D 11/44
[52] U.S. Cl. ........................... 431/115; 431/175; 431/166
[58] Field of Search ..................... 431/115, 175, 431/177, 285, 116, 166

[56] References Cited

U.S. PATENT DOCUMENTS

| | | | |
|---|---|---|---|
| 2,822,864 | 2/1958 | Black | 431/175 |
| 3,180,395 | 4/1965 | Reed | 431/175 |
| 3,217,779 | 11/1965 | Reed et al. | 431/175 |
| 4,175,920 | 11/1979 | Guerre et al. | 431/175 |
| 5,180,300 | 1/1993 | Houis et al. | 431/115 |
| 5,284,438 | 2/1994 | McGill et al. | |
| 5,403,181 | 4/1995 | Tanaka et al. | |
| 5,431,147 | 7/1995 | Tanaka et al. | 431/170 |

FOREIGN PATENT DOCUMENTS

| | | |
|---|---|---|
| 57-165932 | 4/1956 | Japan . |
| 63-503400 | 12/1988 | Japan . |
| 5106842 | 4/1993 | Japan . |
| 8703080 | 5/1987 | WIPO . |

Primary Examiner—Carroll B. Dority
Attorney, Agent, or Firm—Notaro & Michalos P.C.

[57] ABSTRACT

In combustion using air preheated by regenerative direct heat exchange between exhaust gas and the combustion air using a regenerator as a heat exchange medium, the present invention relates to a low-NOx burner that is effective for reduction in NOx in a mid-temperature range which has been conventionally difficult to be realized and improves stability of the flame. According to this low-NOx burner, at an outlet of an air throat 24 for flowing a full quantity of the combustion air is disposed a burner tile 22 having an enlarged diameter portion 23 thereof whose diameter is larger than that of the outlet, and a fuel nozzle 19 for injecting the fuel from the enlarged diameter portion 23 of the burner tile is also provided. Further, a flow of the combustion air injected from the air throat 24 produces a negative pressure at a secondary combustion chamber 25 surrounded by the enlarged diameter portion 23 of the burner tile around the air throat 24 to cause a strong furnace exhaust gas recycle to occur, and a flame holding area X1, a furnace exhaust gas recycle combustion area X2 and a slow combustion area X3 are formed.

15 Claims, 8 Drawing Sheets

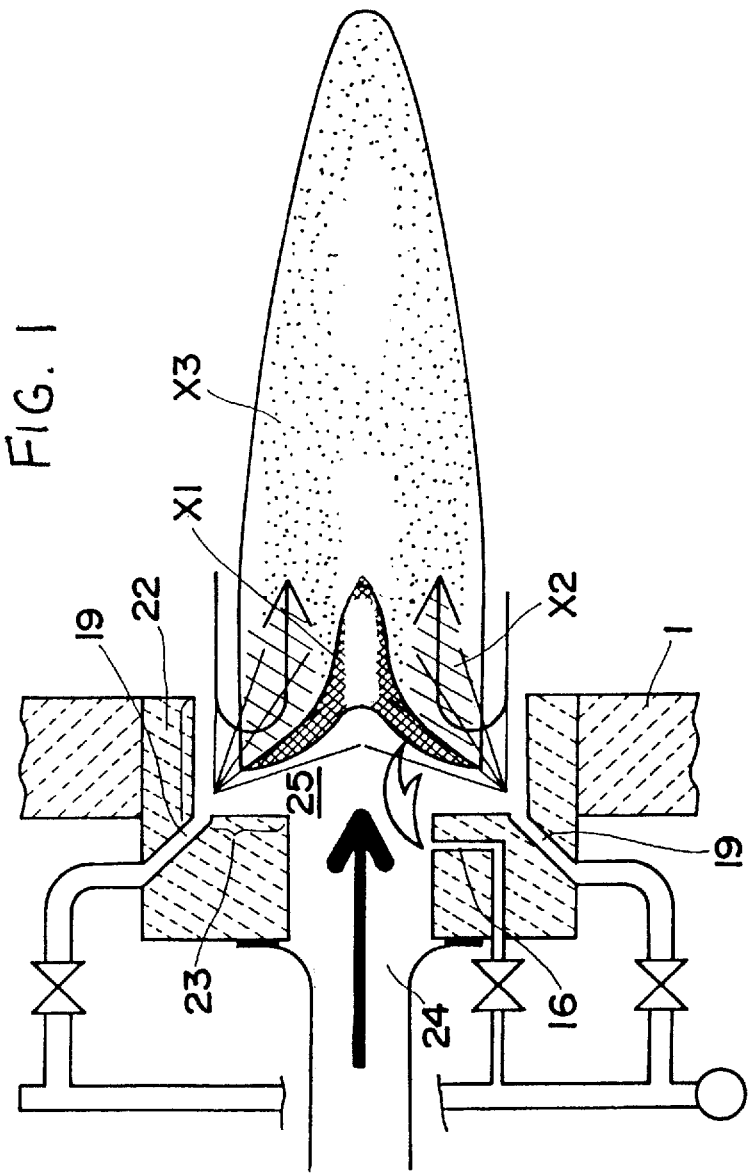

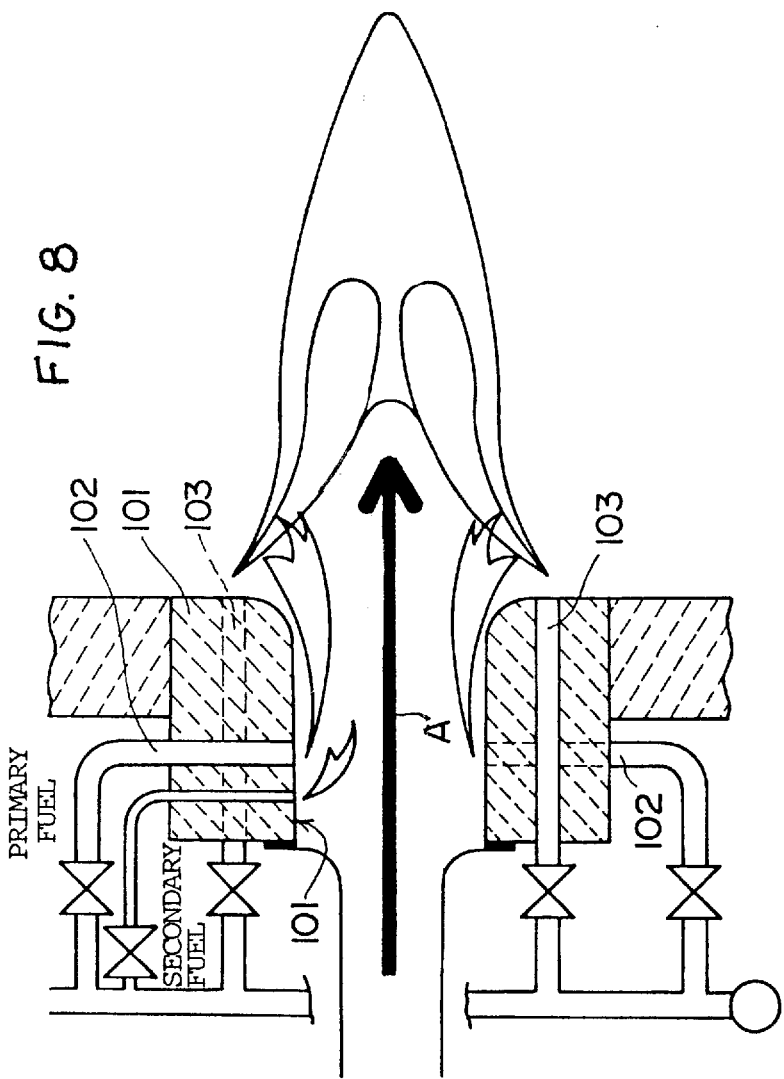

LOW-NOX BURNER

FIELD OF THE INVENTION

The present invention relates to a low-NOx burner. More particularly, in combustion using air preheated utilizing exhaust gas by direct heat exchange between exhaust gas and combustion air using a regenerator, the present invention relates to a low-NOx burner that is effective for reduction in NOx in a mid-temperature range which was conventionally difficult to be realized, as well as a high-temperature range.

BACKGROUND OF THE INVENTION

In order to reduce NOx in a burner, there has been conventionally adopted such a two-stage fuel combustion method as shown in FIG. 8 that is disclosed in, for example, Japanese patent-laid open publication No. 6-50508 (U.S. Pat. No. 5,403,181). According to this two-stage fuel combustion method, fuel is supplied from a primary nozzle 102 and a secondary nozzle 103 to combustion air A flowing in a burner throat 101 at two stages, and a primary flame is formed using the primary fuel and the full quantity of the combustion air while a secondary flame is formed by a reaction of mixture of the secondary fuel and the high-temperature combustion gas of the primary flame. Since a density of oxygen is low in the vicinity of the secondary fuel nozzle, NOx of the primary flame can be reduced by a reducing reaction.

However, in the burner adopting this two-stage fuel combustion method, since a direction of injection of the secondary fuel forming the main flame is substantially parallel with a flow of the combustion air, stability of the secondary flame is lowered when a temperature is low, and the flame can not be therefore stabilized unless the combustion air is preheated above approximately 1000° C. When a direction of injection of the fuel is changed to be closer to a direction perpendicular to a flow of the combustion air to stabilize the secondary flame at a low temperature, the flame is stabilized but local combustion occurs to locally rise a temperature, thereby increasing NOx. In this manner, stabilization of the flame and reduction in NOx have been difficult to be simultaneously realized.

Therefore, as in the case where the burner is used as a heat source for a molten aluminum holding furnace, stabilization of the flame is deteriorated when operating in a mid-temperature range in which a relatively-low temperature of approximately 700° to 800° C. is obtained or when starting the furnace at a low temperature, and the prior art two-stage fuel combustion method is hence difficult to effect. Further, since a direction of injection of the fuel forming the main flame is substantially parallel to a flow of the combustion air, a very long flame can be obtained and it is difficult to use-the method when combustion is performed in a narrow space such as around a crucible of the molten aluminum holding furnace or under the crucible.

DISCLOSURE OF THE INVENTION

It is an object of the present invention to provide a low-NOx burner that improves stability of the flame and is effective for reduction in NOx in a mid-temperature range which was conventionally difficult to be realized as well as in a high-temperature range, in combustion using preheated air obtained by direct heat exchange with combustion exhaust gas utilizing a regenerator.

To this end, according to the present invention, in a low-NOx burner for preheating combustion air by a direct heat exchange that alternately flows exhaust gas and combustion air through a regenerator to inject fuel from the circumference of a flow of the combustion air, there are provided at an outlet of an air throat for injecting the preheated combustion air a burner tile having an enlarged diameter portion whose diameter is larger than that of the throat and a fuel nozzle for injecting fuel obliquely with respect to a flow of the combustion air from the enlarged diameter portion of the burner tile.

In this low-NOx burner, a flow of the combustion air injected from the air throat produces a negative pressure inside the enlarged diameter portion of the burner tile around this flow of the combustion air, i.e., a secondary combustion chamber constituted by the enlarged diameter portion of the burner tile, and strong furnace exhaust gas recycle thereby occurs. Further, the combustion air jet is temporarily compressed by the fuel Jet that collides therewith in a slant direction, and a space that is not filled with the combustion air jet is formed between the combustion air jet and the burner tile provided therearound to stimulate inflow of the furnace gas. That is, the furnace gas recycle is stimulated and the exhaust gas recycle combustion area can be assuredly formed. Furthermore, part of the fuel rapidly diffused in the burner tile and part of the preheated combustion air form a flame holding area to stabilize the flame. At this time, in the area apart from the fuel nozzle in the circumferential direction, the combustion air jet that expands as getting closer to an outlet of the sub combustion chamber constituted by the enlarged diameter portion of the burner tile blocks inflow of the furnace exhaust gas, and air self-recycle is generated at the enlarged diameter portion of the burner tile closer to the air throat, thereby contributing to formation of the flame holding area. Meanwhile the furnace exhaust gas that is strongly induced into the burner tile is mixed with part of the fuel by the flow of the combustion air to cause recycle combustion of the furnace exhaust gas to occur. Also, outside of the burner tile residual oxygen and the gas of incomplete combustion due to the recycle combustion of the furnace exhaust gas cause slow combustion to occur, thus realizing reduction in NOx and stabilized combustion. In addition, the short flame can be obtained.

Accordingly, even if a direction of injection of the fuel is moved to be closer to a direction vertical to a flow of the combustion air to improve stabilization of the flame at a low temperature, part of the fuel causes the exhaust gas recycle combustion to prevent generation of NOx at a high temperature. Moreover, when the high-temperature combustion air is used, stabilization of the flame can be improved, and combustion can be carried out in a limited narrow space because the short flame can be formed while preventing NOx from being generated. Combustion at a low temperature can be also stabilized. This is effective for reduction in NOx in the temperature rising process in a furnace for iron or the like operating at a relatively-high temperature, e.g., approximately 1000° C. or above, and more effective for reduction in NOx and stabilization of the flame in a furnace for fusing metal other than iron that operates at a relatively-low temperature and in a mid-temperature range in which the operation was difficult. Thus, even if combustion is carried out in a narrow space such as a space around or below a crucible of the molten aluminum holding furnace, generation of NOx can be suppressed.

Further, in the low-NOx burner according to the present invention, it is preferable to provide the fuel nozzle at positions at which the fuel is so injected as to sandwich a flow of the combustion air in two directions at high speed. In this case, the combustion air jet is temporarily compressed by the fuel jet that collides therewith in a slant direction to have a flat fan-like shape, and a space that is not filled with the combustion air jet is formed between the combustion air jet and the burner tile provided therearound to stimulate inflow of the furnace gas. That is, the furnace gas recycle is sufficiently stimulated, and the exhaust gas recycle combustion area can be assuredly formed. On the other hand, in the area apart from the fuel nozzle in the circumferential direction, the combustion air jet that expands as getting closer to the outlet of the sub combustion chamber constituted by the enlarged diameter portion of the burner tile blocks inflow of the furnace exhaust gas to enhance the tendency of air self-recycle at the enlarged diameter portion of the burner tile closer to the air throat, and the density of oxygen in the vicinity of the fuel nozzle is increased to stabilize ignition, thereby contributing to formation of the flame holding area. Further, since the combustion air jet is diffused in the flat fan-like shape, the shorter flame can be formed.

Here, when a burner is installed on a furnace wall having a curved surface or is obliquely installed with respect to the furnace wall, a distance from a furnace wall of a secondary combustion chamber formed by the enlarged diameter portion of the burner tile in the depth direction is not fixed and varies. In such a case, intrusion of the furnace exhaust gas to the enlarged diameter portion of the burner tile tends to easily occur in a portion where the distance from the furnace wall surface of the secondary combustion chamber formed by the enlarged diameter portion of the burner tile is shallow and the exhaust gas recycle combustion is actively generated, but the furnace exhaust gas hardly intrudes at a portion where that distance is long. Therefore, according to the low-NOx burner of the present invention, when the distance from the furnace wall surface of the secondary combustion chamber formed by the enlarged diameter portion of the burner tile in the depth direction varies, the fuel nozzle is provided at a portion where that distance is maximum. In this case, intrusion of the furnace exhaust gas to a part where the fuel is injected can be reduced, and density of oxygen is not lowered, improving stabilization of ignition.

In addition, according to the low-NOx burner of the present invention, the fuel nozzle is also used as a pilot burner. In this case, since a pilot flame is formed along the fuel Jet, the flame is stabilized and the structure of the burner can be simplified. Further, since only the combustion air flows into the air throat that is provided on the upstream side of the enlarged diameter portion of the burner tile, there is no limitation in, for example., increase in a flow speed of the combustion air injected by throttling an outlet of the air throat or provision of the regenerator for preheating the combustion air in the vicinity of the outlet of the air throat.

In addition, according to the low-NOx burner of the present invention, a pilot burner is provided in the enlarged diameter portion of the burner tile separately from the fuel nozzle. In this case, since a pilot light is made by a pilot burner controlled separately from the fuel nozzle, stabilization of ignition is improved and control with a large turn down ratio can be facilitated. Further, since the pilot burner or the fuel nozzle is not provided in the air throat and only the combustion air flows through the air throat, the flow speed of the combustion air blown out by throttling an outlet of the air throat can be increased, for example, and the exhaust gas recycle generated in the enlarged diameter portion of the burner tile around the flow of the combustion air becomes powerful, thus stimulating reduction in NOx. Furthermore, provision of the regenerator inside the air throat in the vicinity of the outlet thereof can reduce a quantity of heat of the regenerator which is not used for preheating the combustion air but wasted in the air and prevent a temperature of the exhaust gas led into the regenerator from being lowered, and the heat loss can be suppressed. Moreover, the high-temperature piping is not required, and the facility cost and the space can be largely reduced. Only the combustion air flows in the air throat provided on the upstream side of the enlarged diameter portion of the burner tile, and there is hence no limitation in, for example, increase in the flow speed of the combustion air blown out by throttling the outlet of the air throat or installation of the regenerator for preheating the combustion air in the vicinity of the outlet of the air throat.

According to the low-NOx burner of the present invention, the pilot fuel is injected in the air throat provided on the upstream side of the enlarged diameter portion of the burner tile. At this stage, a stable flame area is formed by the pilot fuel injected in the air throat provided on the upstream side of the enlarged diameter portion of the burner tile, and the flame can be stabilized even when this area makes a pilot light and the temperature of the combustion air is lowered. For example, even when the burner is used as a heat source of the furnace operated in the mid-temperature range of 700° to 800° C. such as a molten aluminum holding furnace, the flame can be stabilized and a quantity of generated NOx is small.

In addition, according to the low-NOx burner of the present invention, there are provided a first fuel nozzle for injecting the fuel in a direction substantially orthogonal to the flow of the combustion air in the air throat disposed on the upstream side of the enlarged diameter portion of the burner tile when a temperature of the furnace is low and a second fuel nozzle for injecting the fuel from the enlarged diameter portion of the burner tile after the temperature of the furnace has reached a predetermined value. In the above description, a predetermined temperature is not necessarily an operating temperature of the furnace but a temperature at which the flame can be maintained only by injection of the fuel from the second fuel nozzle or a higher temperature.

In tnis invention, when the temperature of the furnace is low and combustion is hard to be stabilized, the fuel is injected from the first fuel nozzle to rapidly mix and diffuse the combustion air and the fuel by orthogonal collision, whereby stable combustion can be obtained. Here, even if the combustion air has a low temperature, the fuel injected from the first fuel nozzle can be rapidly mixed with the combustion air to be stably diffused for combustion. However, a quantity of the generated NOx is small because of the low temperature of the furnace and thereby in the tolerance. When the temperature of the furnace has reached a predetermined temperature, the fuel is injected from only the second fuel nozzle of the enlarged portion of the burner tile to cause the slow combustion of the incomplete combustion gas and the residual oxygen occur so that generation of NOx is suppressed. Therefore, a quantity of the generated NOx can be reduced during rise of the temperature of the furnace to the rated operating temperature.

BRIEF DESCRIPTION OF THE DRAWINGS

FIG. 1 is a principle view used for explaining a schematic structure and the status of combustion of the low-NOx burner according to the present invention;

FIG. 8 is a principle view showing a general two-stage fuel combustion burner as a prior art low-NOx burner.

BEST MODES FOR EMBODYING THE INVENTION

Figure 2A:
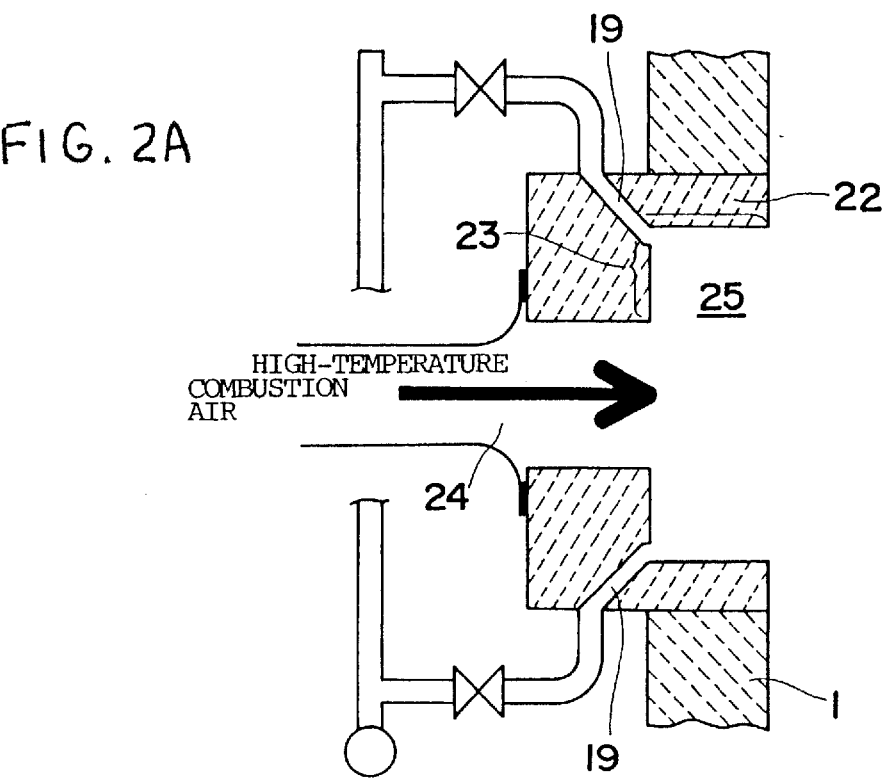
FIG. 2A is a principle view used for explaining a schematic structure and the status of combustion of the low-NOx burner according to another embodiment of the present invention.

The structure of the present invention will now be described in detail based on embodiments illustrated in the drawings.

FIG. 1 schematically shows an embodiment of the low-NOx burner according to the present invention. This low-NOx burner injects fuel to a flow of combustion air preheated by regenerative heat exchange with exhaust gas utilizing a regenerative medium constituted by a regenerator from circumference of the flow of the combustion air. The NOx burner has such a configuration as that a burner tile 22 having an enlarged diameter portion 23 thereof whose diameter is larger than that of a air throat 24 is provided at an outlet of the air throat and a fuel nozzle 19 for injecting the fuel from the enlarged diameter portion 23 of the burner tile is formed. In this embodiment, the combustion air is not restricted to the air preheated to a high temperature of 800° to 1000° C. or above, and the present invention also demonstrates its effect when using the combustion air preheated to a temperature greatly lower than an exhaust gas temperature, but the air preheated to a temperature close to the exhaust gas temperature is used as the combustion air in this embodiment. For example, although not illustrated, the combustion air is preheated to a temperature close to the exhaust gas temperature and supplied by direct heat exchange such as that the exhaust gas and the combustion air alternately pass through a regenerator formed of honeycomb ceramics for a predetermined time. Therefore, when starting up the furnace or when a set temperature in the furnace is low from the beginning, the temperature of the combustion air to be preheated is low. Further, when the furnace is ready to be operated in the mid-temperature range of 700° to 800° C. or the higher-temperature range, the temperature of the combustion air becomes relatively high. In addition, the fuel may be injected from the enlarged diameter portion 23 of the burner tile into a secondary combustion chamber 25 formed by the enlarged diameter portion 23 in the burner tile 22. Although a direction of injection of the fuel is not restricted to a certain direction, it is preferable to inject the fuel toward a flow of the combustion air, and more preferably, the fuel may be injected obliquely with respect to the flow of the combustion air to cause the collision, or most preferably, the fuel nozzles 19 may be provided at positions at which the fuel is so injected as to sandwich a flow of the combustion air jet in two directions at high speed, as shown in FIG. 1. In this case, furnace exhaust gas recycle combustion and slow combustion outside the burner tile 22 can be stimulated to further suppress generation of NOx as compared with the case where the fuel is vertically injected to the flow of the combustion air.

Also, a pilot burner 16 is provided on the upstream side of the enlarged portion 23 of the burner tile so that the pilot fuel is injected into the air throat 24. When the combustion air is supplied at a high temperature of above 1000° C., the pilot burner 16 does not have to constantly carry out combustion in the vicinity of the enlarged diameter portion 23 of the burner tile. The pilot burner 16 may be provided at a further upstream portion or in the vicinity of the fuel nozzle 19 of the enlarged diameter portion 23 of the burner tile depending on the situation.

According to the low-NOx burner having such an arrangement, part of the fuel obliquely injected from the enlarged diameter portion 23 of the burner tile and part of the combustion air fully blown out from the air throat 24 are diffused and mixed together to form a flame holding area X1 as shown in FIG. 1, and the stable flame is formed. Although it is needless to say that the flame is stabilized when the high-temperature combustion air is supplied, the flame can be also stabilized even when the combustion air is supplied at a relatively-low temperature during, e.g., starting-up of the furnace. Further, the furnace exhaust gas is strongly induced into the enlarged diameter portion 23 of the burner tile by the combustion air injected from the air throat 24 at a high flow speed, and the exhaust gas is mixed with part of the fuel obliquely injected from corners of the enlarged diameter portion 23 of the burner tile to cause exhaust gas recycle combustion to occur and forms an exhaust gas recycle combustion area X2 in which combustion is generated with insufficiency of air. Outside the burner tile 22, there is formed an area X3 in which the residual oxygen in the combustion gas from the flame holding area X1 and the incomplete combustion gas generated in the exhaust gas recycle combustion area X2 in the enlarged diameter portion 23 of the burner tile react to cause low combustion to occur. Thus, even if the combustion air is supplied at a high temperature to locally have a high temperature and the thermal. NOx is generated, NOx is reduced by exhaust gas recycle combustion and slow combustion, and low NOx can be realized on the whole. In this case, since the gas is prevented from excessively diffused toward outside of an axis of the flame by directly injecting the fuel into the burner tile 22, a quantity of gas that was not burnt during combustion can be suppressed to the minimum level.

Figure 2B:
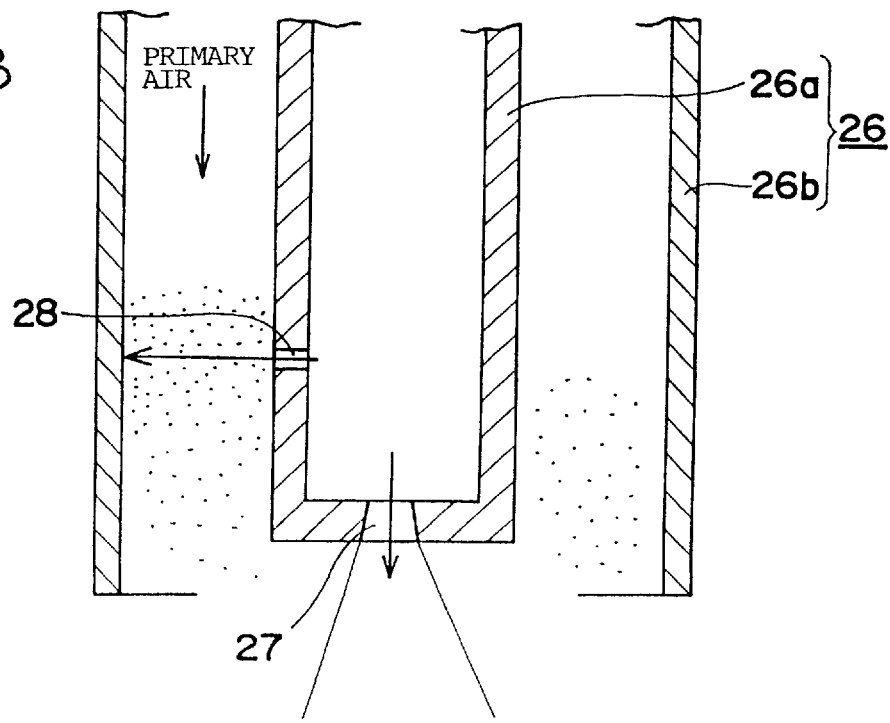
FIG. 2B is a cross-sectional view showing a fuel nozzle portion of the low-NOx burner illustrated in FIG. 2A.

In the case of the embodiment illustrated in FIG. 1, there has been shown an example in which the one-stage fuel nozzle 19 and the pilot nozzle (burner) 16 are separately provided, but the present invention is not restricted to thereto, and a fuel nozzle, which can be also used as a pilot burner, such as shown in FIGS. 2A and 2B may be adopted to eliminate the pilot burner. For example, when the fuel nozzle 19 provided at the enlarged diameter portion 23 of the burner throat is substituted by a fuel nozzle 26 that does double duty as a pilot nozzle such as shown in FIGS. 2A and 2B, a primary flame can be formed along the fuel jet around the fuel jet injected into a secondary combustion chamber 25. This fuel nozzle 26 which also serves as the pilot nozzle is constituted by a fuel nozzle 26a and a primary air pipe 26b for flowing primary air around the fuel nozzle 26a, and the primary air that is approximately 10% of secondary air flows around the fuel nozzle 26a. The fuel nozzle 26a has an injection opening 27 formed at a tip thereof as well as a pilot fuel injection opening 28 for injecting part of the fuel toward the inner peripheral wall of the primary air pipe 26b formed therearound to cause collision, and there is formed a pilot burner for injecting part of the fuel as the pilot fuel and diffusing the injected fuel by collision on the inner peripheral wall of the primary air pipe 26b to obtain the excellent mixture of the primary air and the injected fuel. Further, a igniter (not shown) is provided so that the stable primary flame can be formed during combustion.

Figure 4:
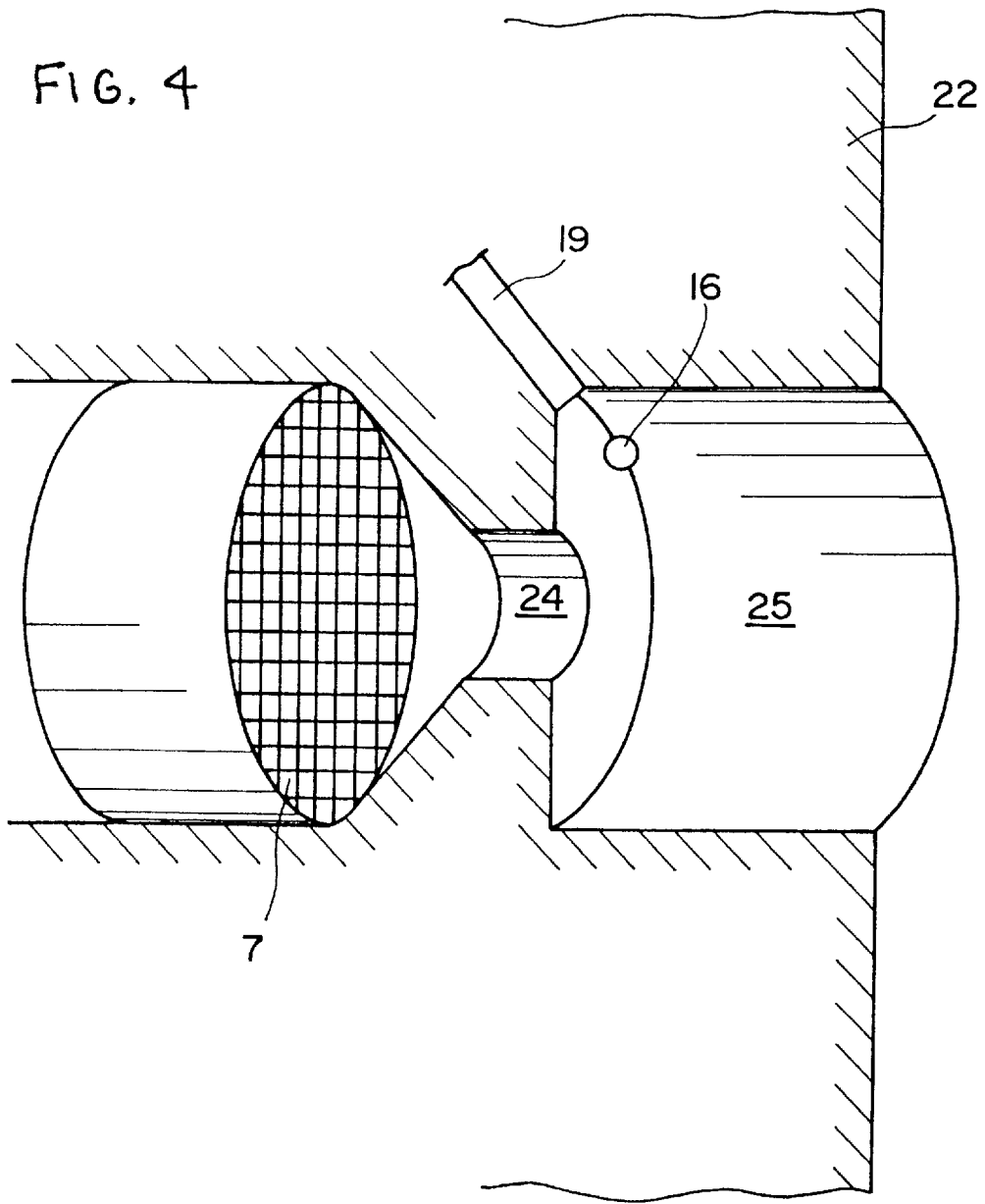
FIG. 4 is a schematic block diagram showing the low-NOx burner according to a further embodiment of the present invention.

Moreover, as shown in FIG. 4, the pilot burner 16 controlled separately from the fuel nozzle 19 can be disposed at the enlarged diameter portion 23 of the burner tile. The pilot burner 16 is provided at the enlarged diameter portion 23 of the burner tile within the range in which the fuel injected from the fuel nozzle 19 can be fired. In this case, since a pilot light can be formed by the pilot burner 16, stability of ignition can be improved, and control with a large turn down ratio can be facilitated. In addition, since the pilot burner or the fuel nozzle is not provided to the air throat 24 and only the combustion air flows through the air throat 24, it is possible to come up with various ideas to increase the jet velocity of the combustion air, and there is not required control for installing the regenerator in the vicinity of the outlet of the air throat 24. For example, the flow speed of the combustion air injected by throttling the outlet of the air throat 24 can be further raised as compared with that of the embodiment illustrated in FIG. 1. In this case, the exhaust gas recycle generated in the enlarged diameter portion 23 of the burner tile around the flow of the combustion air becomes powerful to stimulate reduction in NOx. Also, the regenerator 7 can be disposed inside the air throat 24, and more particularly inside the air throat 24 in the vicinity of the outlet thereof. A quantity of heat of the regenerator 7 that is not used for preheating the combustion air but wasted in the air can be thus reduced, and a temperature of the combustion exhaust gas that is led into the regenerator 7 through the air throat 24 and the secondary combustion chamber 25 which is formed by the enlarged diameter portion 23 of the burner tile can be prevented from being lowered, thereby suppressing the thermal loss. Since the regenerator 7 can be provided inside the air throat 24 formed at a part of the burner tile 22, the high-temperature piping is not required, and both the facility cost and the space can be greatly reduced.

Figure 3:
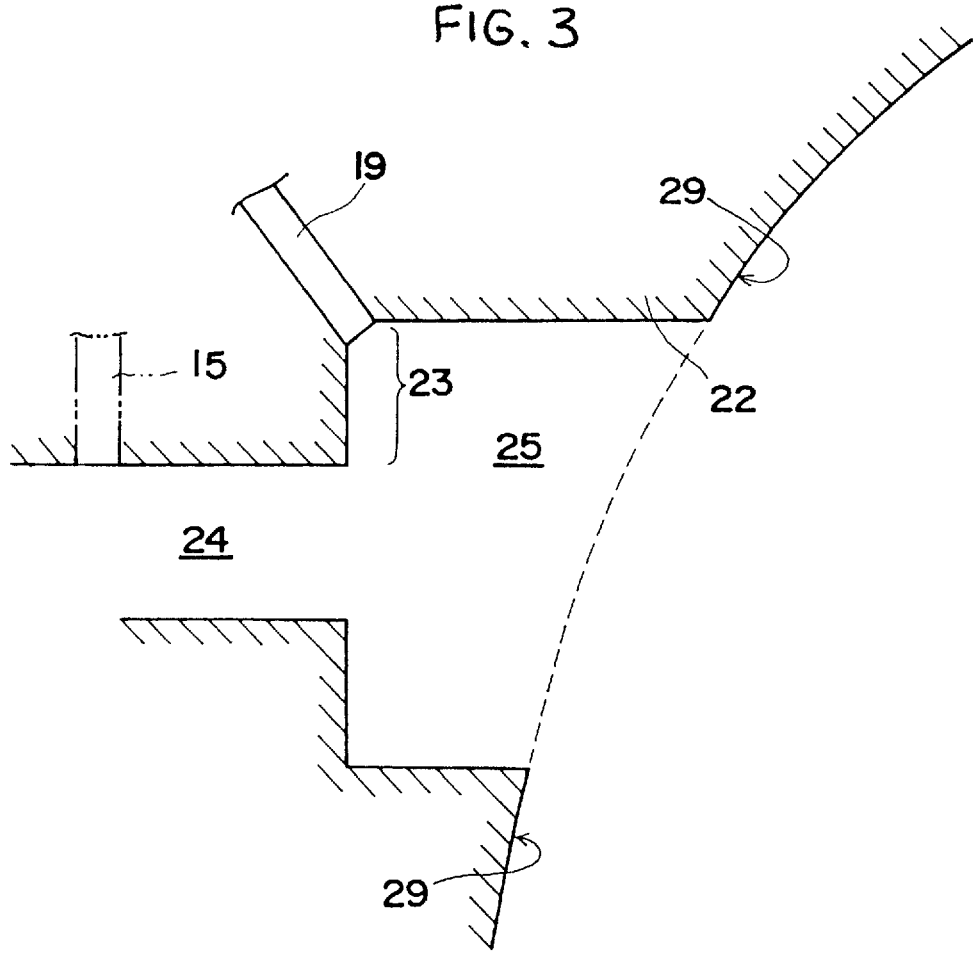
FIG. 3 is a schematic block diagram showing the low-NOx burner according to still another embodiment of the present invention.
Figure 6:
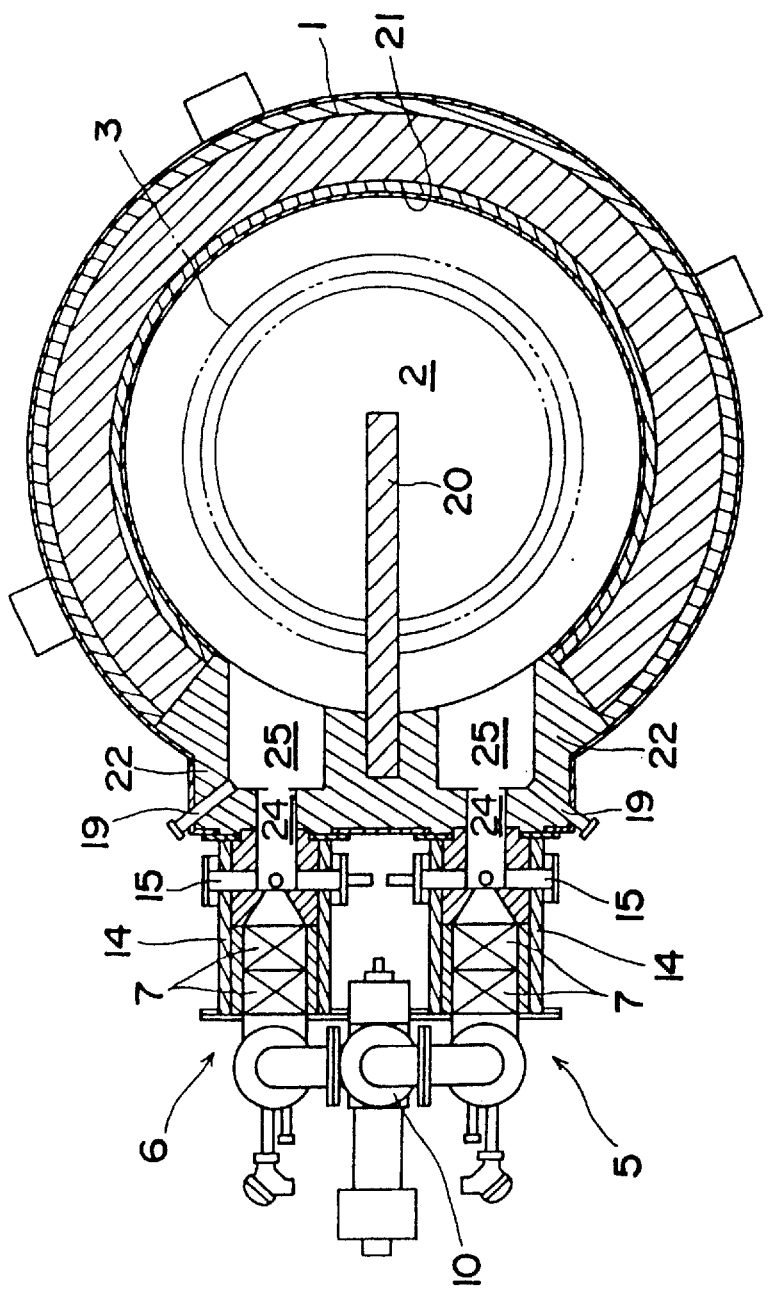
FIG. 6 is a horizontal cross section showing the furnace illustrated in FIG. 5.

In addition, when the burner is provided on, for example, a curved wall of the furnace such as shown in FIG. 6 or when it is provided in an inclined fashion, a length of the secondary combustion chamber 25 constituted by the enlarged diameter portion 23 of the burner tile from the wall surface 29 in the furnace in the depth direction is not fixed, and the length may differ depending on the positions. In this case, as shown in FIG. 3, the nozzle 26 that also serves as the pilot nozzle may be preferably set at a position at which the length of the enlarged diameter portion 23 of the burner tile from the wall surface 29 in the furnace becomes maximum. It is also true of the case where the regular combustion nozzle and a pilot burner are provided instead of the nozzle 26 that also serves as the pilot nozzle. In this example, intrusion of the furnace exhaust gas to the secondary combustion chamber 25 inside the enlarged diameter portion 23 of the burner tile is apt to occur at a portion where a length of the secondary combustion chamber 25 from the wall surface in the furnace is small and the exhaust gas recycle is actively generated, but the exhaust gas in the furnace hardly intrudes into the secondary combustion chamber 25 at a portion where that length is large. Therefore, if the fuel nozzle 19 or the nozzle 26 that also serves as the pilot burner is disposed at a portion where the length of the secondary combustion chamber 25 constituted by the enlarged diameter portion 23 of the burner tile is long, the density of oxygen is not lowered at a portion where the fuel is injected, thereby improving stability of ignition.

Moreover, as shown by a virtual line in FIG. 3, the first fuel nozzle 15 for injecting the fuel into the air throat 24 on the upstream side of the fuel nozzle 19 of the enlarged diameter portion 23 of the burner throat may be provided separately from the fuel nozzle 19. In this embodiment, it may be possible that: the first fuel nozzle 15 for injecting the fuel into the air throat 24 on the upstream side of the fuel nozzle 19 of the enlarged diameter portion 23 of the burner throat is separately provided in the flow of the preheated combustion air; a full quantity of the fuel is injected from the first fuel nozzle 15 until the temperature in the furnace reaches a predetermined value to perform diffusion and combustion; and injection of the fuel from the first fuel nozzle 15 is stopped after the temperature in the furnace has reached a predetermined value to inject the fuel from the second fuel nozzle 19. Here, although not shown, a pilot burner or a igniter is usually disposed in the range where the fire is put on the fuel injected from the first fuel nozzle 15. Note that the predetermined temperature is not necessarily an operating temperature of the furnace but a temperature at which the flame can be maintained by only injection of the fuel from the second fuel nozzle or an above temperature.

Figure 5:
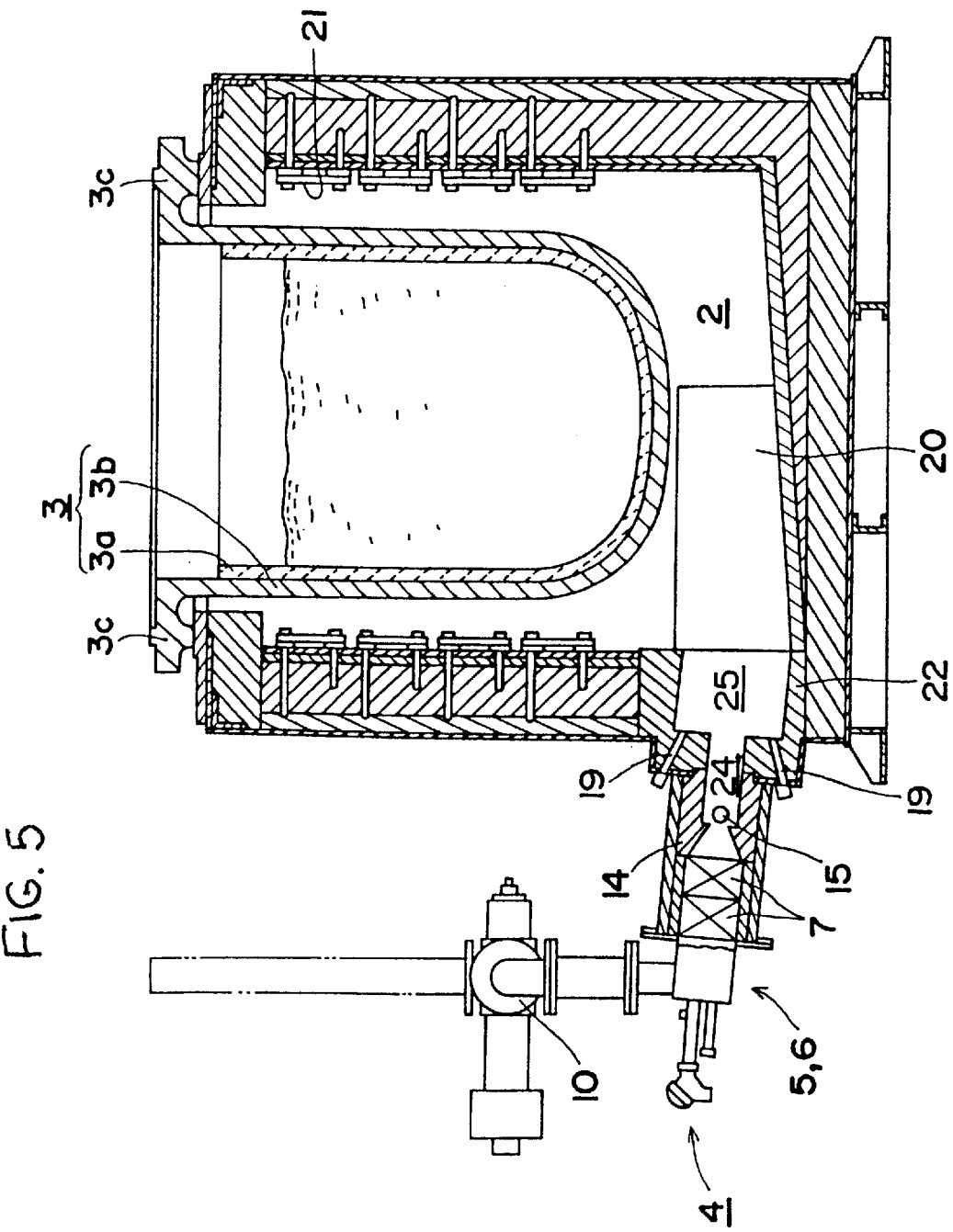
FIG. 5 is a vertical cross section showing an embodiment of a furnace for holding molten non-iron metal/aluminum using the low-NOx burner according to the present invention.
Figure 7:
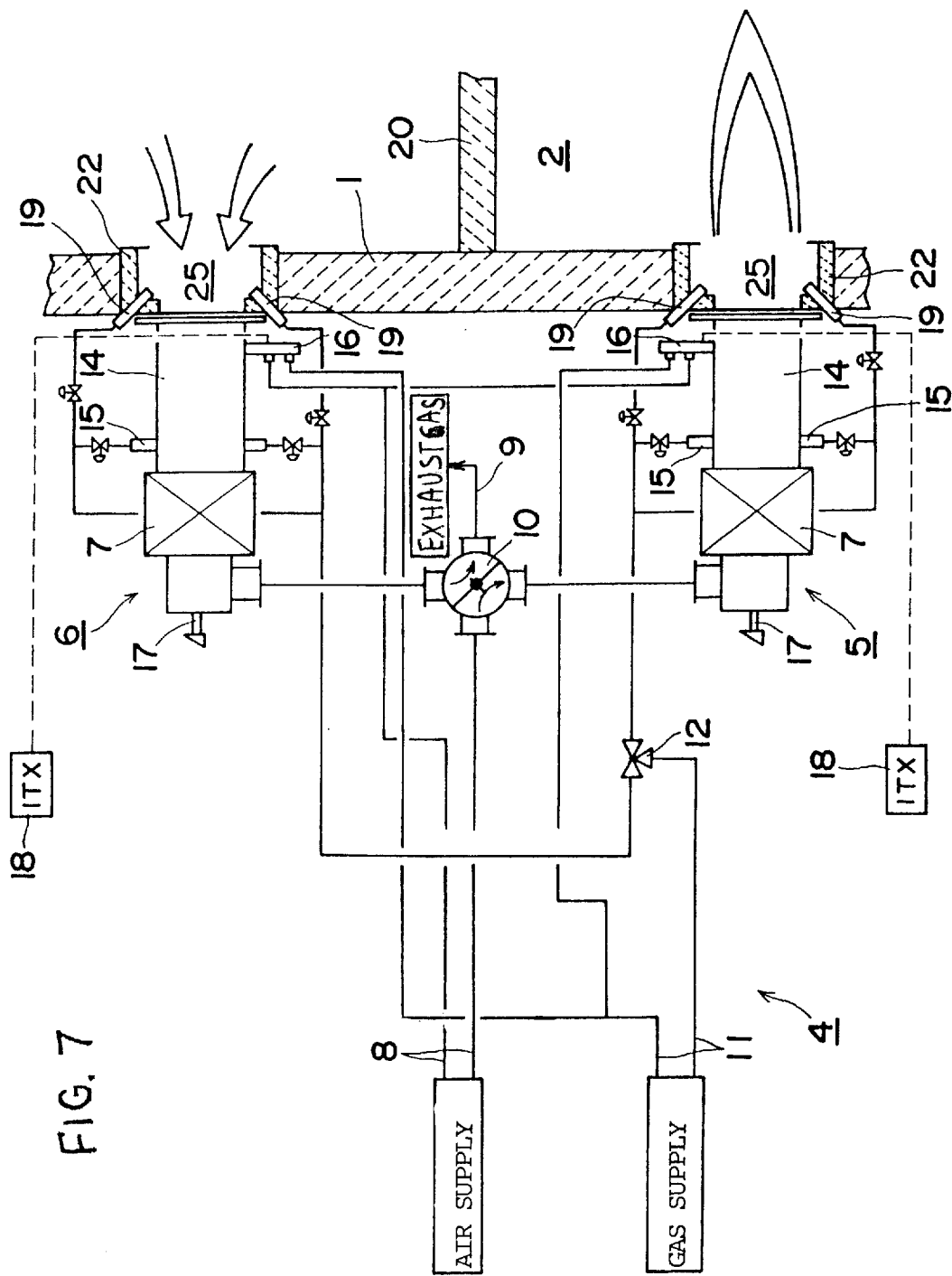
FIG. 7 is a schematic view showing an embodiment using the low-NOx burner according to the present invention.

The burner having the above arrangement can be utilized as a heat source in various facilities for reducing NOx and forming the short flame. For example, FIGS. 5 to 7 show an example in which the low-NOx burner according to the present invention is utilized as a heat source of a furnace holding molten non-iron metal. A molten aluminum holding furnace is used as the furnace holding molten non-iron metal, while the burner having the first fuel nozzle and the second fuel nozzle is used as the burner in this example.

The molten aluminum holding furnace is made up of, for example, a furnace body 1 having a steel casing inside of which is lined with insulating fire material, a crucible 3 accommodated so as to be suspended in the center of the furnace body 1, and a regenerative burner system 4 functioning as a heat source. Although one regenerative burner system 4 is provided, two or more systems may be used.

The furnace body 1 supports the crucible 3 having the molten aluminum therein in the surrounding manner and maintains the crucible 3 and the peripheral portion thereof at a temperature suitable for heat insulation of the molten aluminum. The furnace body 1 is formed into, for example, a substantially-cylindrical shape having a bottom as illustrated in the drawing and provided to suspend the crucible 3 in the center. The crucible 3 includes a crucible made of heat insulating material 3a such as graphite for accommodating the molten aluminum therein and a metal crucible 3b for housing the heat insulating crucible 3a, and a flange portion 3c formed on the upper end of the metal crucible 3b is mounted on the furnace body 1 so that the portion below the flange 3c is inserted and suspended in the furnace body 1. A combustion space 2 is formed at a bottom of the furnace body 1 below the suspended crucible 3. Further, a partition wall 20 is provided in the combustion space 2 and the inside of the furnace body 1 is partitioned in the C shape. Furthermore, on the inner wall surface of the furnace body 1 is disposed -an electric heater 21 used for maintaining the molten aluminum in the crucible at a minimum temperature by only the electricity when the furnace is not used on weekends or used in case of emergency. Although not illustrated, a cover and a molten metal pot for applying the pressure on the molten metal to be taken out are provided to the crucible 3.

At least one regenerative burner system 4 is disposed to the combustion space 2 at the bottom of the furnace body 1. In this embodiment, a pair of burners 5 and 6 with the partition wall 20 therebetween are disposed. There is used the regenerative burner system 4 having such a configuration as that the regenerator 7 is included in the burner body 14 to integrate the pair of burners 5 and 6 for alternate combustion and the exhaust gas can be emitted through the burner that is not in operation for combustion and the regenerator. For example, as shown in FIG. 7, a combustion air supply system 8 for supplying the combustion air and an exhaust system 9 for emitting the combustion gas can be selectively connected to the regenerator 7 of each of the two burners 5 and 6 by a four-way valve 10, and the combustion air is supplied to one burner 5 (or 6) through the regenerator 7 while the exhaust gas is emitted from the other burner 6 (or 5) through the regenerator 7. The combustion air is supplied by, for example, a non-illustrated forced draft fan or the like, and the exhaust gas is attracted from the furnace and emitted in the air by an exhaust means such as an induced draft fan. Further, part of the combustion air and the fuel is distributed to a pilot burner gun 16. The pilot burner gun 16 is provided to inject the pilot fuel into the air throat 24 from the enlarged diameter portion 23 of the burner tile on the upstream side. At an outlet of the air throat 24 is disposed the burner tile 22 having the enlarged diameter portion 23 thereof whose diameter is larger than that of the air throat 24. Note that reference numeral 14 denotes a burner body; 17, a flame detector; and 18, a pilot burner ignition transformer in the drawings. Although not shown, a solenoid valve, a manual valve or the like for controlling a flow of the fluid are provided to each line.

The fuel supply system 11 is selectively and alternatively connected to one of the burners 5 and 6 through, for example, a three-way valve 12 to supply the fuel. The fuel nozzle is made up of a first fuel nozzle 15 disposed to be directed to the inside of the air throat 24 and a second fuel nozzle 19 for injecting the fuel from the enlarged diameter portion 23 of the burner tile 22 formed at an outlet of the air throat 24, and the fuel is injected from one of these nozzles. The first fuel nozzle 15 is disposed on the peripheral surface of the air throat 24, to which a full quantity of the combustion air is supplied through the regenerator 7, in a direction orthogonal to a flow of the combustion air and injects the fuel from the peripheral surface of the air throat 24 in a direction orthogonal to the flow of the combustion air. Further, the fuel nozzle 19 is provided in such a manner that the fuel is injected from the enlarged diameter portion 23 of the burner tile 22 formed at the outlet of the air throat 24 into the burner tile 22. In this embodiment, the second fuel nozzle 19 is arranged at a corner of the enlarged diameter portion 23 of the burner tile 22 to face inside so that the fuel diagonally collides with the combustion air injected from the air throat 24.

Here, the burners 5 and 6 and the electric heater 21 as the heating means use the same temperature detecting means, for example, a thermocouple or a temperature controller, and an output electric signal of the controller is directly led to the thyristor to control a quantity of electricity when driving the heater while the output electric signal is converted into an on/off signal by an A/D converter to control the fuel adjusting valve and the air adjusting valve when the burner performs combustion.

In addition, it is preferable to use the cylindrical regenerators 7, each having a plurality of honeycomb-shaped cell holes, molded with material in which heat capacity is large and durability is excellent while the pressure loss is relatively small, for example, ceramics. In this case, even if the temperature of the exhaust gas is lowered below the sulfuric acid dew point when recovering heat from the combustion exhaust gas, sulfur components in the fuel or substances obtained by its chemical change are captured in the ceramics, and a duct or the like of the exhaust system provided on the downstream side is not subjected to the low-temperature corrosion. Of course, the present invention is not restricted to the above configuration and material, and it is possible to employ any other regenerator of ceramic ball type or nugget type.

According to the molten aluminum holding furnace having the above arrangement, the crucible 3 maintains the molten aluminum at a temperature suitable for heat insulation in the following manner.

A full quantity of the fuel is first injected from the first fuel nozzle 15 to be burnt until the temperature in the furnace reaches a predetermined value. The crucible 3 and the furnace body 1 are then heated. At this stage, the fuel injected from the first fuel nozzle 15 is immediately mixed with the combustion air even though the combustion air has a low temperature, and the injected fuel is stably burnt by the pilot flame provided nearby.

When the temperature in the furnace has become a predetermined value, injection of the fuel from the first fuel nozzle 15 is stopped, and the fuel is then injected from the second fuel nozzle 19. The predetermined temperature described above is not necessarily an operating temperature of the furnace but a temperature at which the flame can be maintained only by injection of the fuel from the second fuel nozzle or a higher temperature. Here, even if the furnace operated in the mid-temperature range of 700° to 800° C. such as a molten aluminum holding furnace is used, the rapidly-diffused fuel and part of the combustion air form the flame holding area X1 to stabilize the flame when the fuel is obliquely injected to collide with the high-temperature combustion air in the burner tile 22 because the fuel from the second fuel nozzle 19 is injected to inside to collide with the high-temperature combustion air injected from the air throat 24. Meanwhile, the exhaust gas in the furnace strongly induced into the burner tile 22 by a flow of the combustion air is mixed with the fuel to form the exhaust gas recycle combustion area X2, and combustion with insufficient air is generated. Moreover, outside the burner tile 22, oxygen remaining In the combustion gas from the flame holding area X1 is mixed with the incomplete combustion gas generated due to the exhaust gas recycle combustion in the furnace cause slow combustion to occur. Therefore, the flame is stabilized and NOx is not increased.

Note that combustion in one burner of the regenerative burner system 4, e.g., the burner 5 involves emission of the combustion gas used for heating the crucible 3 in the combustion space 2 from the air throat 24 of the other burner 26 through the combustion gas exhaust system 9. That is, since the fuel supply system 11 for the other burner 6 is closed by the three-way valve 12 at the burner 6 and connected with the exhaust system 9 by the change-over operation of the four-way valve 10, combustion is not carried out and the fuel supply system 11 is used as an exhaust path for the exhaust gas. The crucible 3 is heated by the flame and the radiant heat of the combustion gas. Here, since the combustion air to be supplied to the burner 5 is preheated by direct contact with the regenerator 7 in a short time and then supplied into the burner body 14, the combustion air has a high temperature close to that of the exhaust gas. Accordingly, when the combustion air is mixed with the fuel injected from the first fuel nozzle 15 or the second fuel nozzle 19, stable combustion can be effected with a small amount of fuel and the high-temperature combustion gas can be obtained. Further, since the temperature of the combustion air is also rapidly changed with increase/decrease in a quantity of combustion, responsibility with respect to adjustment of the temperature of molten metal is excellent.

Thus, the fluctuation in the temperature of the molten metal and fraction defective can be decreased, and the temperatures in the furnace and the crucible 3 can be rapidly raised to the heat insulating temperature. Note that switching between combustion and exhaust is performed at an interval of, e.g., ten seconds to two minutes, more preferably within one minute, or most preferably at an extremely-short interval of approximately 10 to 40 seconds. In this case, heat exchange is effected with a high temperature effectiveness. Furthermore, the change-over operation may be carried out when the temperature of the combustion gas emitted through the regenerator 7 has become a predetermined temperature, e.g., 200° C. In this example, since a position of the flame is frequently changed, a heat pattern in the combustion chamber can be made uniform, and non-uniform heating or heat insulation can be reduced.

When the temperature in the furnace has reached a value suitable for reserving heat of the molten aluminum, e.g., 800° to 900° C., combustion in the burner system 4 is turned down so that the temperature suitable for reserving heat of the molten aluminum in the crucible 3 can be maintained. In addition, in an emergency such as an accident of the fuel gas supply system or on holidays that supervision by a burner operator is impossible, operation of the burner system 4 is stopped and inside of the furnace is maintained at a minimum temperature by the electric heater 21.

Although the above embodiment is one preferred example of the present invention, it is not restricted thereto, and various modifications are possible within the true scope of the present invention. For example, description has been given as to the case where the preheated combustion air is obtained by alternate combustion utilizing the regenerator which is connected to or mounted inside of the burner, but the present invention is not restricted to this structure, and the combustion exhaust gas and the combustion air pass through the regenerator for a predetermined time, and the combustion air preheated by the exhaust heat of the high-temperature combustion exhaust gas may be continuously supplied to a single burner for continuous combustion by relatively rotating the regenerator with respect to the combustion air supply system and the exhaust system using a passage change-over means such as disclosed in International laid-open publication No. W094/02784 or by switching a direction of a flow of the fluid with respect to the regenerator using a passage change-over means. Furthermore, although the description has been given as to the case where the gas fuel is used in the above embodiment, the present invention is not limited thereto, and it is also possible to use the liquid fuel such as oil. Moreover, the burner of respective embodiments illustrated in FIGS. 1 to 4 can be applied to the molten aluminum holding furnace shown in FIGS. 5 to 7. In such a case, reduction in NOx can be realized for the operation in the mid-temperature range including start-up of the furnace or the operation in the high-temperature range, and the flame can be stabilized.

What is claimed is:

1. A burner device forming a combustion area on the downstream side of an air throat portion with use of a combustion air flow through the air throat portion and a fuel injected through a fuel nozzle comprising:

preheating means for preheating a combustion air by means of a heat exchange action effected by a regenerator between an exhaust combustion gas produced in a primary combustion area and the combustion air being fed to the primary combustion area, the exhaust combustion gas and the combustion air alternately introduced through the regenerator; and an enlarged diameter portion of a burner tile having an internal diameter greater than an internal diameter of said throat portion so as to define a secondary combustion area around an outlet of the air throat portion;

wherein said throat portion is arranged to inject the combustion air preheated by said preheating means and axially direct the combustion air therethrough toward the primary combustion area on the downstream side of the throat portion; and wherein the secondary combustion area extends radially outward of said throat portion adjacent to the outlet thereof, and said fuel nozzle is positioned in a peripheral zone of said enlarged portion of the burner tile and oriented so as to direct the fuel into the central section of said combustion air flow whereby a part of a primary combustion gas produced in said primary combustion area is induced toward said secondary combustion area to form a recirculation gas flow thereof.

2. A burner device according to claim 1, further comprising a pair of fuel nozzles positioned on opposite sides of said air throat portion so that a fuel injection pressure of the said pair of fuel nozzles acts on both sides of the combustion air flow having passed through said air throat portion.

3. A burner device according to claim 1, wherein a furnace wall defining an in-furnace combustion area is curved or inclined with respect to a surface of said enlarged diameter portion of the burner tile surrounding the outlet of said air throat portion, and said fuel nozzle is positioned at a part of the enlarged diameter portion which has a distance from the furnace wall substantially indicating a maximum value.

4. A burner device according to claim 1, wherein said fuel nozzle is provided with pilot burner means for functioning as a pilot burner.

5. A burner device according to claim 1, wherein a pilot burner for igniting the fuel injected through said fuel nozzle is provided in said enlarged diameter portion.

6. A burner device according to claim 1, wherein said throat portion is provided with fuel injection means for injecting a fuel into an air flow passage of the air throat portion.

7. A burner device according to claim 1, wherein said primary combustion area includes a flame stabilizing region in which a stable combustion reaction is caused and maintained under an existence of said combustion air, and a slow combustion region which is continuously created on the downstream side of the flame stabilizing region and which effects a slow combustion reaction.

8. A burner device according to claim 1, wherein said fuel nozzle is positioned at a peripheral part of said enlarged diameter portion substantially coplanar with a plane of the outlet of said air throat portion.

9. A burner device according to claim 1, wherein said regenerator is located on the upstream side of said air throat portion and has a honeycomb structure through which said combustion air is allowed to flow; and reducing means for reducing a flow passage area of the combustion air is provided between the regenerator and the air throat portion so as to increase a flow velocity of the combustion air flowing out of the regenerator, so that said combustion air flow is axially directed into said primary combustion area through said air throat portion as a combustion air flow having a high flow velocity.

10. A burner device forming a combustion area on the downstream side of an air throat portion with use of a combustion air flow through the air throat portion and a fuel injected through a fuel nozzle comprising:

preheating means for alternately introducing the combustion air flow being fed to a primary combustion area and the exhaust combustion gas produced therein through a regenerator and preheating the combustion air flow by means of a heat exchange action effected through a regenerator between the exhaust combustion gas and the combustion air;

an enlarged diameter portion of a burner tile having an internal diameter greater than an internal diameter of said throat portion so as to define a secondary combustion area around the outlet of the air throat portion;

first fuel injection means for injecting a fuel from the secondary combustion area to the combustion air flow in an inclined angle thereto; and a second fuel injection means for injecting a fuel to the combustion air flow introduced through the air throat portion;

wherein said air throat portion injects the combustion air flow preheated by said preheating means in an axial direction of the air throat portion toward said primary combustion area, said secondary combustion area extends radially outward of the air throat portion adjacent to the outlet thereof and said first fuel injection means is positioned in a periphery zone of said enlarged diameter portion so as to inject the fuel toward a central section of said combustion air flow; and wherein said second fuel injection means is adapted to feed the fuel to the combustion air flow in the air throat portion when a temperature level in the primary combustion area is in a relatively low range, whereas said first injection means is adapted to feed the fuel to said combustion areas when said temperature is raised up to a high temperature range above a predetermined temperature.

11. A burner device having an air flow injection means for feeding a combustion air flow to a combustion area, fuel supply means for feeding a fuel to the combustion air flow, and air preheating means for preheating the combustion air to be supplied to the air flow injection means, comprising:

the air flow injection means having an outlet for injecting air flow oriented so as to direct the preheated air flow to the combustion area;

chamber forming means for defining a cylindrical secondary combustion chamber on the downstream side of said outlet adjacent thereto, said chamber forming means being formed in a periphery of the outlet so as to surround the combustion air flow discharged from the outlet whereby a recirculation flow of the combustion gas produced in the combustion area is caused by an inducement action of the combustion air flowing out of the outlet said fuel supply means oriented to inject fuel toward a central region of said cylindrical secondary combustion chamber;

wherein said combustion area includes a flame stabilizing region, a recirculation combustion region and a slow combustion region, said fuel supply means injects the fuel from said secondary combustion chamber toward said combustion area to generate a stable combustion reaction in said flame stabilizing region, a part of the fuel and the recirculation flow, including said combustion gas, generate a combustion reaction of a relatively low oxygen density in said recirculation combustion region, and the combustion gas produced in the flame stabilizing region generates a gently performing combustion reaction in said slow combustion region.

12. A burner device according to claim 11, wherein said flame stabilizing region is partially created in the secondary combustion chamber.

13. A burner device according to claim 11, wherein said recirculation combustion region is formed in a periphery zone of said flame stabilizing region.

14. A burner device according to claim 11, wherein said slow combustion region is continuously formed on the downstream side of said flame stabilizing region.

15. A burner device forming a combustion area on the downstream side of an air throat portion with use of a combustion air flow through the air throat portion and a fuel injected through a fuel nozzle comprising:

preheating means for alternately introducing the combustion air flow being fed to a primary combustion area and the exhaust combustion gas produced therein through a regenerator and preheating the combustion air flow by means of a heat exchange action effected through a regenerator between the exhaust combustion gas and the combustion air, said regenerator having a honeycomb structure for allowing the combustion air to be introduced therethrough and is positioned on an upstream side of said air throat portion;

an enlarged diameter portion of a burner tile having an internal diameter greater than an internal diameter of said throat portion so as to define a secondary combustion area around the outlet of the air throat portion;

first fuel injection means for injecting a fuel from the secondary combustion area to the combustion air flow in an inclined angle thereto; and a second fuel injection means for injecting a fuel to the combustion air flow introduced through the air throat portion in a direction substantially perpendicular to the combustion air flow in the throat portion;

wherein said air throat portion injects the combustion air flow preheated by said preheating means in an axial direction of the air throat portion toward said primary combustion area, said secondary combustion area extends radially outward of the air throat portion adjacent to the outlet thereof and said first fuel injection means is positioned in a periphery zone of said enlarged diameter portion so as to inject the fuel toward a central section of said combustion air flow; and wherein said second fuel injection means is adapted to feed the fuel to the combustion air flow in the air throat portion when a temperature level in the primary combustion area is in a relatively low range and capable of terminating a fuel injection operation, whereas said first injection means initiates a fuel injection operation at a predetermined temperature and is adapted to feed the fuel to said combustion areas when said temperature is raised up to a high temperature range above the predetermined temperature;

reducing means for reducing a cross-section of a combustion air flow passage which is provided between said regenerator and said air throat portion, whereby the combustion air flow having passed through the regenerator has an increased flow velocity, such that the higher flow velocity combustion air flow flowing out of the air throat portion toward the primary combustion area generates a negative pressure in said secondary combustion area so as to induce a combustion gas produced in the primary combustion area into the secondary combustion area.

* * * * *